US010609771B2

United States Patent
Van Tooren et al.

(10) Patent No.: US 10,609,771 B2
(45) Date of Patent: Mar. 31, 2020

(54) PRINTABLE SUSCEPTOR FOR USE IN INDUCTION WELDING

(71) Applicants: University of South Carolina, Columbia, SC (US); Kok & Van Engelen Composite Structures B.V., The Hague (NL)

(72) Inventors: Michael Van Tooren, Elgin, SC (US); Harm van Engelen, The Hague (NL)

(73) Assignee: University of South Carolina, Columbia, SC (US)

( * ) Notice: Subject to any disclaimer, the term of this patent is extended or adjusted under 35 U.S.C. 154(b) by 246 days.

(21) Appl. No.: 15/680,739

(22) Filed: Aug. 18, 2017

(65) Prior Publication Data

US 2018/0063895 A1    Mar. 1, 2018

Related U.S. Application Data

(60) Provisional application No. 62/376,472, filed on Aug. 18, 2016.

(51) Int. Cl.
*H05B 6/10* (2006.01)
*H05B 6/02* (2006.01)
*F16B 5/08* (2006.01)

(52) U.S. Cl.
CPC .............. *H05B 6/105* (2013.01); *F16B 5/08* (2013.01); *H05B 6/02* (2013.01)

(58) Field of Classification Search
CPC .............. H05B 6/02; H05B 6/105; F16B 5/08
See application file for complete search history.

(56) References Cited

U.S. PATENT DOCUMENTS

| | | | | |
|---|---|---|---|---|
| 5,313,034 A | * | 5/1994 | Grimm | B23K 13/02 156/274.2 |
| 5,500,511 A | * | 3/1996 | Hansen | B29C 65/3656 156/272.4 |
| 6,237,873 B1 | | 5/2001 | Amaoka et al. | |
| 7,126,096 B1 | * | 10/2006 | Matsen | B21D 26/055 219/633 |
| 2014/0291886 A1 | * | 10/2014 | Mark | B29C 70/384 264/163 |
| 2017/0057167 A1 | | 3/2017 | Van Tooren et al. | |
| 2017/0341301 A1 | | 11/2017 | Van Tooren et al. | |

* cited by examiner

*Primary Examiner* — Daniel McNally
(74) *Attorney, Agent, or Firm* — Dority & Manning, P.A.

(57) ABSTRACT

A composite fibrous susceptor for use in induction welding is described, along with methods of its construction and use. The composite fibrous susceptor can include a magnetically susceptible continuous fiber in conjunction with a thermoplastic polymer. The composite fibrous susceptor can be deposited according to an additive manufacturing process on a surface to be bonded according to an induction welding process.

10 Claims, 4 Drawing Sheets

PRINTABLE SUSCEPTOR FOR USE IN INDUCTION WELDING

CROSS REFERENCE TO RELATED APPLICATION

This application claims filing benefit of U.S. Provisional Patent Application Ser. No. 62/376,472 having a filing date of Aug. 18, 2016, which is incorporated herein by reference for all purposes.

BACKGROUND

The development of fiber-reinforced polymeric composite materials has been of great benefit as these materials can provide excellent strength characteristics and corrosion resistance at low densities. Polymeric composites have been of particular benefit in the transportation industry, where the ability to produce light weight, strong, and resistant panels from polymeric components has greatly enhanced efficiency of vehicles and decreased both construction and operating costs.

Unfortunately, utilization of fiber-reinforced polymeric composites to their full potential, and in particular as replacement for traditional metal-based materials, remains limited due to high costs, a large portion of which can be attributed to assembly. Costs associated with assembly and adequate fastening of polymeric-based composites can be significant as connecting bonds lack the presence of the reinforcement materials and generally rely on the resin matrix alone for bond strength. To insure formation of the strongest possible welds, the bond must provide the fullest possible contact and matrix participation throughout the entire bond area.

To improve polymeric composite assembly methods and outcomes, joining methods such as induction welding have been developed. Induction welding is a non-contact welding process that encourages fusion bonding between components. A process uses alternating magnetic fields to induce eddy currents and thereby heat magnetically susceptible materials (susceptors) within and/or adjacent to the bond area. A typical induction welding device includes an alternating current generator, a coil to generate the AC magnetic fields, and often a ferromagnetic element that can channel and direct the magnetic fields to the susceptor located within/near the bond. A fusion bond is created when thermoplastic polymers at the joining surfaces are heated by the susceptors to the melting or softening point as the surfaces are held in contact with one another. The surfaces are generally held in contact under pressure while the materials cool below the softening temperatures to complete the bonding process. When considering bonding between two thermoplastic composites, the matrix materials at the bonding surfaces can mix and form a fusion bond. When considering thermoset-based composites, a thermoplastic material associated with the susceptor and/or at the surface of the thermosets can function as an adhesive to bond the composites.

A variety of forms and materials have been examined for use as susceptors. Typically, induction welding methods include the placement of a welding interlayer susceptor tape within the bond area. The welding tape generally includes the susceptor and thermoplastic resin either coating or sandwiching the susceptor. Conventional susceptors are metallic and have a regular pattern of openings. Unfortunately, achieving a uniform, controllable temperature in the bond area, which is crucial to preparing a weld of adequate integrity to permit use of induction welding in high stress applications such as in the transportation industry, is difficult with these conventional susceptors.

Additives of polymeric composites have also been utilized as susceptors. While this method is possible, e.g., composite additives such as graphite or boron fibers can be heated directly by induction, it presents certain challenges. The exponential decay of the strength of magnetic fields dictates that, in induction welding processes, the susceptible structure closest to the induction coil will be the hottest, since it experiences the strongest field. As such, it is difficult to obtain adequate heating in the bond area without overheating areas of the composite away from the bond and closer to the coil. The matrix resin in a large area or even in the entire composite can overheat and melt, which can result in porosity in the product, delamination, and, in some cases, destruction or denaturing of the polymer. Composites that include magnetically susceptible additives can successfully be welded by induction, but they require use of a susceptor of significantly higher conductivity than the additive to selectively peak the heating in the bond area.

What are needed in the art are susceptors that can be individually designed for and applied to fiber reinforced polymeric composites according to the particular composite components, geometry, and use. Improved design and application of susceptors can provide improved control and uniformity of temperature in the bond area and can provide welds with improved strength and integrity.

SUMMARY

Aspects and advantages of the invention will be set forth in part in the following description, or may be obvious from the description, or may be learned through practice of the invention.

Disclosed is a composite fibrous susceptor and a method for induction welding polymeric structures by use of the composite fibrous susceptor. The composite fibrous susceptor can include a magnetically susceptible continuous fiber (e.g., a carbon fiber roving) and a thermoplastic polymer. In general, a method can include depositing the composite fibrous susceptor on a first surface of a first piece (e.g., a first fiber reinforced polymeric composite) according to a predetermined pattern. The method can also include locating a second surface of a second piece (e.g., a second fiber reinforced polymeric composite) against the first surface of the first piece such that the composite fibrous susceptor extends between the two surfaces. The method also includes inductively heating the magnetically susceptible continuous fiber while holding the two surfaces against one another and thereby forming a fusion bond between the surfaces.

Also disclosed is a welded composite that can be formed according to the method. The welded composite can include a first piece and a second piece joined to one another over a bond area defined by a first bonded surface of the first piece and a second bonded surface of the second piece. The welded composite also includes a magnetically susceptible continuous fiber within the bond area and extending along and between the first and second bonded surfaces.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Repeat use of reference characters in the present specification and drawings is intended to represent the same or analogous features or elements of the present invention.

DETAILED DESCRIPTION

Reference now will be made to embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A composite fibrous susceptor for use in induction welding is generally provided, along with methods of its construction and use. More specifically, the composite fibrous susceptor can include a magnetically susceptible continuous fiber in conjunction with a thermoplastic polymer. Beneficially, the composite fibrous susceptor can be deposited according to an additive manufacturing process, which can allow for formation of individualized susceptor geometries on bonding surfaces so as to optimize the heating of the bond area during an induction welding process. For instance, by use of a three dimensional (3D) printing process, the fibrous susceptor can be printed on a bonding area in multiple directions and orientations, which can lead to the formation of stronger welds between composite structures.

In one embodiment, the composite fibrous susceptor can include a magnetically susceptible continuous fiber roving impregnated with a thermoplastic polymer. The composite structure of the susceptor can provide for excellent heating of a bond area during an induction welding process due to the high surface area of the magnetically susceptible fiber roving and intimate contact between individual fibrils of a magnetically susceptible fiber roving and a polymer impregnated therein, which can encourage efficient heat transfer to the bond area.

Welds formed by use of the disclosed susceptors can exhibit improved strength over previously known induction welds. For instance, the fibrous susceptor can combine the strength and stiffness of a high strength continuous fiber with a thermoplastic polymer that is capable of successful deposition according to an additive manufacturing process and that is also capable of taking part in the weld formed by use of the susceptor. The formed weld can thus include the thermoplastic of the composite fibrous susceptor strongly fused with the surfaces of the composites welded in the bond area. In addition, the thermoplastic of the composite fibrous susceptor can be strongly attached to the continuous fiber by impregnation and/or bonding. As such, the thermoplastic of the fibrous composite susceptor can bridge the continuous fiber to the bonded composites and thereby can incorporate the strength of the continuous fiber into the weld, improving overall weld strength.

Figure 1:
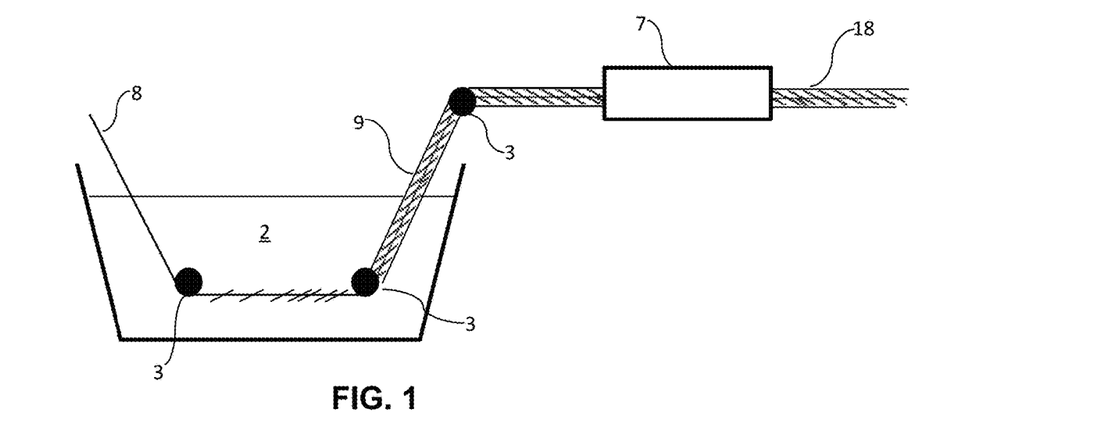
FIG. 1 illustrates a method for forming a composite fiber as may be utilized as a susceptor as described herein.

FIG. 1 schematically illustrates one method for forming a composite fibrous susceptor. The method can include immersing a continuous fiber 8 that includes a magnetically susceptible material into a solution 2 that includes a thermoplastic polymer in a dissolved state and a solvent for the polymer. The fiber 8 can be immersed for a period of time to encourage permeation of the fiber 8 by the solution 2.

While the fibrous susceptor can incorporate any magnetically susceptible continuous fiber 8 as is known in the art (e.g., as a porous or shaped single fiber that can be permeated with the polymer solution), in particular embodiments the continuous fiber 8 can be in the form of a bundle of individual fibers or filaments, e.g., a roving. As used herein, the term "roving" generally refers to a bundle of generally aligned individual fibers or filaments and is used interchangeably with the term "tow." The individual fibers contained within the roving can be twisted about their axis or can be straight and the bundle of fibers can be twisted about one another or generally parallel continuous fibers with no intentional twist to the roving. Although different fibers can be used in a roving, it can be beneficial in some embodiments to utilize a roving that contains a single fiber type, for instance to minimize any adverse impact of using fiber types having a different thermal coefficient of expansion. The number of fibers contained in a roving can be constant or can vary from one portion of the roving to another and can depend upon the material of the fiber. A roving can include, for instance, from about 500 fibers to about 100,000 individual fibers, or from about 1,000 fibers to about 75,000 fibers, and in some embodiments, from about 5,000 to about 50,000 fibers.

The continuous fiber 8 can possess a high degree of tensile strength relative to the mass. For example, the ultimate tensile strength of a continuous fiber 8 can be about 3,000 MPa or greater. For instance, the ultimate tensile strength of a continuous fiber 8 as determined according to ASTM D639 (equivalent to ISO testing method 527) is typically from about 3,000 MPa to about 15,000 MPa, in some embodiments from about 4,000 MPa to about 10,000 MPa, and in some embodiments from about 5,000 MPa to about 6,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000

MPa/g/m or greater, and in some embodiments, from about 5,500 to about 30,000 MPa/g/m.

A continuous fiber 8 may include any magnetically susceptible material capable of being drawn or otherwise formed as a continuous fiber. For example, a continuous fiber 8 may be incorporate a metal fiber (e.g., copper, aluminum, silver, etc.), carbon fibers (e.g., graphitic carbon or metal-coated carbon, etc.), nanotubes, boron fibers, and various other fibrous or fiber forming materials exhibiting magnetic susceptibility.

Graphitic carbon fibers are particularly suitable for use as the continuous fibers in one embodiment as they can exhibit both high strength and desirable magnetic susceptibility. For instance, carbon fibers can typically have a tensile strength to mass ratio in the range of from about 5,000 to about 7,000 MPa/g/m.

The continuous fibers can generally have a nominal diameter of about 2 micrometers or greater, for instance about 4 to about 35 micrometers, and in some embodiments, from about 5 to about 35 micrometers.

Referring again to FIG. 1, a continuous fiber 8 can be immersed in a solution 2 that includes a polymer dissolved in a solvent. For instance, the continuous fiber 8 can be pulled through a bath of the solution by use of a series of rollers 3, as shown. While the composite fibrous susceptor can generally incorporate any thermoplastic polymer that may be successfully associated with the continuous fiber 8, in one embodiment a polymer of the composite susceptor can be the same as is found in a polymeric composite to be welded by use of the susceptor. For instance, in those embodiments in which a high performance thermoplastic polymer composite is to be welded, the continuous fibrous composite can incorporate the same high performance thermoplastic polymer. Exemplary high performance polymers can include, without limitation, amorphous thermoplastics such as polysulfone (PSU), poly(ether sulfone) (PES), and polyetherimide (PEI); imidized materials such as polyimide (PI), polyamide-imide (PAI), and polybenzimidazole (PBI); as well as semi-crystalline thermoplastics such as poly (phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), and polyphenylene sulfones (PPSU) as well as blends and copolymers of high performance polymers.

In one particular embodiment, a thermoplastic polymer that exhibits a high glass transition temperature ($T_g$) can be incorporated in the composite fibrous susceptor. For instance, a thermoplastic polymer having a glass transition temperature of about 150° C. or greater can be dissolved in the solution 2. Exemplary high $T_g$ polymers can include, without limitation, polyethyleneimine, ($T_g$=215° C.), polyamide-imide ($T_g$=275° C.), polyarylate ($T_g$=190° C.), PES ($T_g$=210° C.-230° C.), polyimide ($T_g$=250° C.-340° C.), polyphenylene ($T_g$=158° C.-168° C.), and amorphous thermoplastic polyimide ($T_g$=247° C.). Other examples of high $T_g$ polymers include those that contain one or more of the following monomers (listed along with a published $T_g$ for the homopolymer): 2-vinyl naphthalene ($T_g$=151° C.), 2,4,6-trimethylstyrene ($T_g$=162° C.), 2,6-dichlorostyrene ($T_g$=167° C.), vinyl carbazole ($T_g$=227° C.), vinyl ferrocene ($T_g$=189° C.); acenaphthalene ($T_g$=214° C.), and methacrylic acid anhydride ($T_g$=159° C.).

The solution can include a solvent for the polymer, which can encompass organic or aqueous solvents, as determined according to the characteristics of the polymer. For instance, a solution can include PEI in solution with a suitable solvent, e.g., methanol, ethanol, or chloroform, as is known in the art. The solution can generally include the polymer in an about of about 20 wt. % or less, for instance about 10 wt. % or less in some embodiments.

As illustrated in FIG. 1, as the continuous fiber 8 is pulled or otherwise immersed in the solution 2, the fiber 8 can pick up polymer contained in the solution to form a wet composite fiber 9. Following, the wet composite fiber 9 can be dried to remove the solvent and form the composite fibrous susceptor 18. For instance, the wet composite fiber 9 can be dried through application of energy, e.g., through use of a dryer 7.

Figure 2:
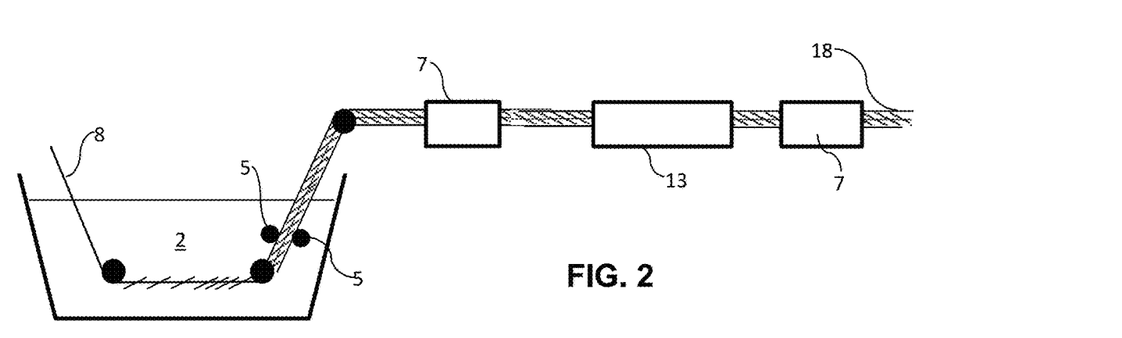
FIG. 2 illustrates another method for forming a composite fiber as described herein.

The composite fibrous susceptor formation process can include additional formation steps in some embodiments. For instance, as illustrated in FIG. 2, a process can include a series of nip rolls 5 or the like that can improve impregnation of the dissolved polymer into the fiber 8.

In one embodiment, a formation process can include a die 13 by use of which the composite fibrous susceptor 18 can be further formed or molded. For instance, the initially formed composite fibrous susceptor 18 can be fed through a die 13 to mold the susceptor and modify the cross-sectional shape of the susceptor 18 and provide a particular and/or more consistent shape to the susceptor 18. Depending upon the nature of the die 13, it may prove beneficial to incorporate a second dryer 7 or the like downstream of the die 13.

Figure 3:
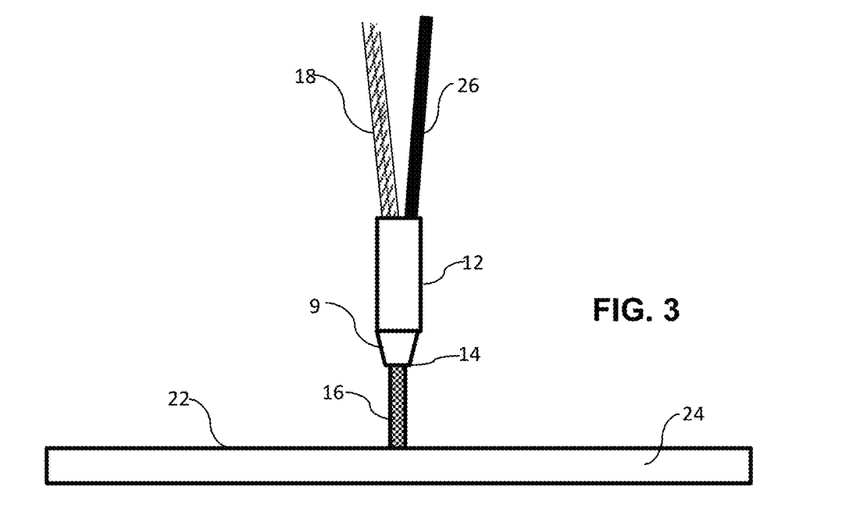
FIG. 3 illustrates method for printing a susceptor as described herein on a work piece.

FIG. 3 illustrates one embodiment of deposition process as may be utilized to print the fibrous susceptor 18 onto a surface 22 of a piece 24 that includes a polymer at the surface 22. In one preferred embodiment, the polymer at the surface 22 can be the same polymer as is incorporated in the composite fibrous susceptor 18.

While the piece 24 can generally be formed of any polymeric material, in one embodiment, the piece 24 can be formed of a polymeric composite, and in one particular embodiment a fiber reinforced polymeric composition that incorporates a thermoplastic and/or a thermoset polymer in conjunction with a fibrous reinforcement additive. For instance, a reinforced thermoplastic composition can include a thermoplastic polymer in conjunction with a fibrous reinforcement additive. In one embodiment, the thermoplastic polymer of a fiber reinforced polymeric composition can be a high performance polymer such as those discussed previously that can exhibit high mechanical properties such as stiffness, toughness, and low creep that make them valuable in the manufacture of structural products such as vehicle shell structures.

A thermoset polymer of a fiber reinforced polymeric composition can include one or more thermoset polymers as are generally known in the art. For example a fiber reinforced thermoset composition can include a matrix resin selected from one or more of an epoxide, a polyimide, a bis-maleimide, a polyphenol, a polyester, etc., or combinations thereof that, when fully cured, forms a crosslinked thermoset matrix. A fibrous susceptor 18 can be deposited on a thermoset-based polymeric composite 24 either prior to or following cure of the thermoset polymer, as desired.

Optionally, a thermoset-based polymeric composite can include a thermoplastic polymer at the surface 22 at least in the area to be welded. For instance, the piece 24 can include a thermoplastic skin or insert at the surface 22 on which the fibrous susceptor is deposited and adjacent to a fiber reinforced thermoset composition. Thermoset/thermoplastic blends are also encompassed, for instance a heterogeneous blend in which the thermoplastic component is at a higher concentration at the surface 22 as compared to deeper within the piece 24. Laminates are also encompassed in which the piece 24 includes multiple layers, at least one of which is formed of a fiber reinforced polymeric composite and the surface 22 of which can include a polymer capable of induction welding according to the disclosed process.

The fibrous reinforcement of a fiber reinforced polymeric composite may include one or more fiber types including, without limitation, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), inorganic fibers including ceramic fibers (e.g., boron, alumina, silicon carbide, silicon nitride, zirconia, basalt, etc.), natural fibers such as jute, bamboo, etc., synthetic fibers (e.g., aramid fibers such as Kevlar® marketed by E. I. duPont de Nemours, polyamide, ultra-high molecular weight polyethylene, paraphenylene, terephthalamide, polyphenylene sulfide, polybenzimidazole), and various other natural or synthetic inorganic or organic fibrous materials known for reinforcing compositions as well as combinations of fiber types. In those embodiments in which the fiber type of the polymeric composite exhibits magnetic susceptibility, the susceptor of the fibrous susceptor 18 should generally exhibit higher conductivity than the fibers, as discussed previously.

The fibers of a fiber reinforced polymeric composite may be chopped fibers, continuous fibers, or fiber rovings. For example, a composite prepreg as is known in the art can be used such as a continuous glass fiber/epoxy resin, which is a common composite material used in polymeric laminates.

In one embodiment, the composite fibrous susceptor 18 can be deposited on the surface 22 as formed with no other material deposited in conjunction with the susceptor. While this embodiment is encompassed, desirable results can be obtained in some embodiments by depositing the composite fibrous susceptor 18 in conjunction with a secondary formation material. The presence of a secondary formation material can improve adherence of the composite fibrous susceptor 18 to the surface of a piece 24 and can also improve characteristics of a weld formed by use of the fibrous susceptor.

By way of example, FIG. 3 illustrates an embodiment in which the composite fibrous susceptor 18 is deposited on the surface 22 of a piece 24 in conjunction with a formation material 26. For example, the formation material 26 can be provided to a print head 12 in the form of a second fiber. The formation material 26 can generally include a thermoplastic polymer that is fed to the print head 12 and is heated above the melting temperature of the formation material 26 to soften and/or liquefy so as to be combined with the fibrous susceptor 18 within the print head 12. The fibrous susceptor 18 is likewise heated to a temperature above the melting temperature of the polymer of the composite susceptor 18. Upon combination of the formation material 26 with the fibrous susceptor 18 within the print head 12, the formation material 26 can blend and/or bond with the polymer of the fibrous susceptor 18 and the formation material 26 can form a partial or continuous coating on the fibrous susceptor 18 to form a composite material 16. The composite material 16 thus formed can pass through the extrusion tip 14 to the surface 22.

The formation material may be formed of one material or an admixture of multiple materials. The formation material 26 can be, for example, a gel, a high viscosity liquid, or a formable solid that can be extruded in the desired pattern. Formation materials can include thermoplastic polymers, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

In one particular embodiment, the formation material 26 can include the same polymer as the polymer of the fibrous susceptor 18 and/or the polymer at the surface 22. For instance, the fibrous susceptor 18 can include a continuous fiber and a high performance thermoplastic polymer and the formation material 26 can include the same thermoplastic polymer. This can improve blending and bonding of the materials in the print head in formation of the composite material 16.

The composite material 16 can be discharged from the print head 12 during the formation of a susceptor pattern on the surface 22. Any suitable method for combining the fibrous susceptor 18 and the formation material 26 can be utilized, provided that the continuous fiber of the fibrous susceptor 18 is adequately incorporated with the formation material 26 following deposition. The type of bond formed between the fibrous susceptor 18 and the formation material 26 can depend upon the materials involved. For instance a thermal bond, a chemical bond, a friction bond, an electrostatic bond, etc., as well as combinations of bond types can be formed between the continuous fiber and the polymer of the fibrous susceptor 18 and between either or both of these components of the fibrous susceptor 18 and the formation material 26 in order that the components will be effectively bonded to one another.

Further, the print head 12 may be configured to apply zero, one, or multiple coatings of formation material 26 on the fibrous susceptor 18. For instance, a deposition process can include periods of co-deposition in conjunction with periods of deposition of the fibrous susceptor 18 alone, which can provide areas of the fibrous susceptor 18 alone and areas of the composite material 16, which can be used to modify and control the heating characteristics at the surface 22.

Discharge of the fibrous susceptor 18 from the print head 12 can be achieved in different manners, depending on the application. In one embodiment, the fibrous susceptor 18 may be advanced through the print head 12 as part of an extrusion process, whereby the fibrous susceptor 18 is "pushed" or urged through the print head 12. In this embodiment, the fibrous susceptor 18 is engaged with a driving system, such as a motorized friction drive wheel(s) or a forced air system, to advance the fibrous susceptor 18 through the print head 12. The fibrous susceptor 18 enters an input orifice in the print head 12 and is advanced toward the extrusion tip 14 of the nozzle 19. The formation material 26 is heated above the melting temperature of the formation material 26 and the fibrous susceptor 18 is heated above the melting temperature of the polymer therein to soften and/or liquefy so as to combine the two through the extrusion tip 14 as the composite material 16 is advanced from the print head 12 and onto the printing surface 22. By movement of the print head 12 and/or the printing surface 22 relative to the print head 12, a susceptor pattern can be formed by additive application of the composite material 16 onto the printing surface 22.

As an alternative to advancing the fibrous susceptor 18 by push or urging through the print head, the fibrous susceptor 18 and formation material 26 may be advanced by a pultrusion operation, whereby the composite material 16 is drawn or pulled from the tip 14. In this embodiment, the contact point of the composite material 16 on the printing surface 22 of the print bed can create an anchor (e.g., a fixed, contact, gripping point, and the like) that allows for the composite material 16 to be pulled from the print head 12 as the printing surface 22 is moved relative to the print head 12.

Drawing or "casting on" of the composite material 16 onto the printing surface 22 to begin the printing process can be accomplished by various methods. For example, the composite material 16 can be connected or adhered to a needle or other structure that can draw the composite material 16 from the print head and apply it to the printing surface 22. As an alternative, the nozzle 14 of the print head 12 may be brought into contact with the printing surface 22 so as to contact the composite material 16, whereby the composite material 16 (e.g., the formation material 26 encompassed in the composite material 16) adheres to the printing surface 22 creating an anchor for pulling the composite material 16 from the print head 12.

The rate of advancement of the composite material 16 through the print head 12, the temperature of the formation material 26, the polymer of the fibrous susceptor 18 and/or in some instances, the temperature of the printing surface 22 require some level of control to ensure that the composite material 16 is applied in a manner to provide at least some adherence between the composite material and the surface 22. For example, the temperature of the formation material 26 and the fibrous susceptor 18 and the rate of movement of the print bed may be controlled to ensure that the composite material 16 is applied in a manner to allow for adherence of the composite material 16 to the printing surface 22. In some instances, the printing surface can also or alternatively be temperature controlled for this purpose. In general, the rate of combination and temperature of the formation material 26 with the fibrous susceptor 18 are controlled to ensure that the formation material 26 is combined in a desired manner with the fibrous susceptor 18 and that the composite material 16 is drawn from the print head 12 in a consistent manner.

Tensioning of the composite material 16 may also be utilized for proper advancement onto the printing surface. Tensioning systems can take many forms and can be located at different positions in the process to provide proper tensioning of the fibrous susceptor 18 and/or the composite material 16. For example, a spool maintaining the fibrous susceptor 18 can be fitted on a tensioning system, such as a rotational break or clutch that impedes rotation of the spool as fibrous susceptor 18 is meted from the spool to provide tensioning. Similarly, the print head 12 may include a tensioning system, such as restrictive pulleys, clutch, friction element or the like to apply tension to the composite material 16.

It is also contemplated that the printer can be equipped to perform both "push" and pultrusion of the composite material 16 to advance the fibrous susceptor 18 through the print head 12. In this embodiment, there may be drive means associated with the print head 12 to advance the composite material 16 through the print head assisted by a pulling effect of the movement of the print bed on the composite material 16 as it is advanced.

According to one embodiment, a susceptor pattern can be formed by use of a 3D printer that utilizes a six (6) degrees of freedom (or more, including seven degrees of freedom) system that allows the printing of composite material in different directions and orientations relative to a plane perpendicular of a print bed. The term "6 degrees of freedom" refers to the freedom of movement in three-dimensional space of the print bed onto which the fibers are printed. Specifically, a print bed can have six (6) independently controllably movements: three translational movements and three rotational movements. The translational movements are up/down, left/right, and forward/backward, and the three rotational movements are typically referred to as pitch, roll, and yaw. The print head may be fixed relative to some degrees of freedom, such as up/down, or alternatively capable of exhibiting motion in all six degrees of freedom.

The various degrees of freedom of the print bed allow for the fibrous susceptor 18 to be applied to a complex shape above and beyond what is achievable by a standard 3D printer. For instance, the orientation, elevation, angle, and the like of printing surface may be varied during the printing process to maintain consistency of deposition of the fibrous susceptor 18. For example, the fibrous susceptor 18 can be applied as the print bed is periodically or continuously altered in direction/orientation to create a complex pattern of fiber(s) and/or composite material, such as for example, a zigzag pattern, a pattern including random or patterned angles or curvature, or a complex shape on the polymeric composite that cannot be achieved by linear application of material as performed by traditional 3D printers. The fibrous susceptor 18 may even be twisted about itself by manipulation of the print bed relative to the fiber(s) or composite material during application.

Figure 4A:
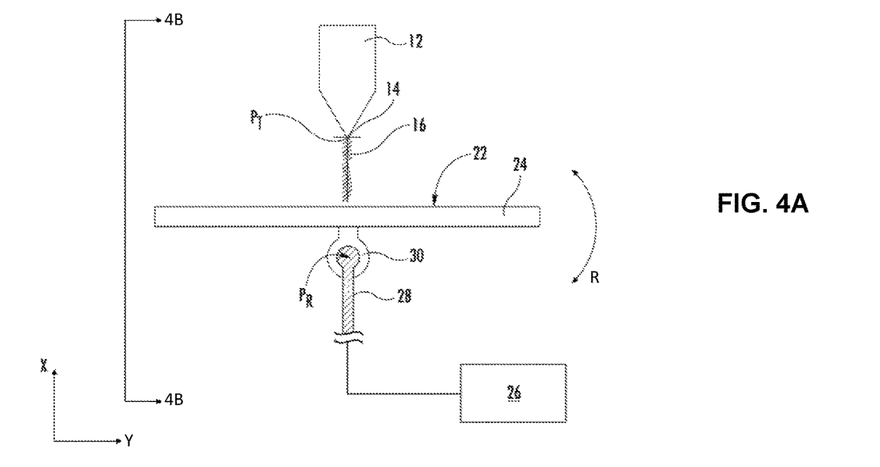
FIG. 4A shows a front view of another method for printing a susceptor as described herein on a work piece.
Figure 4B:
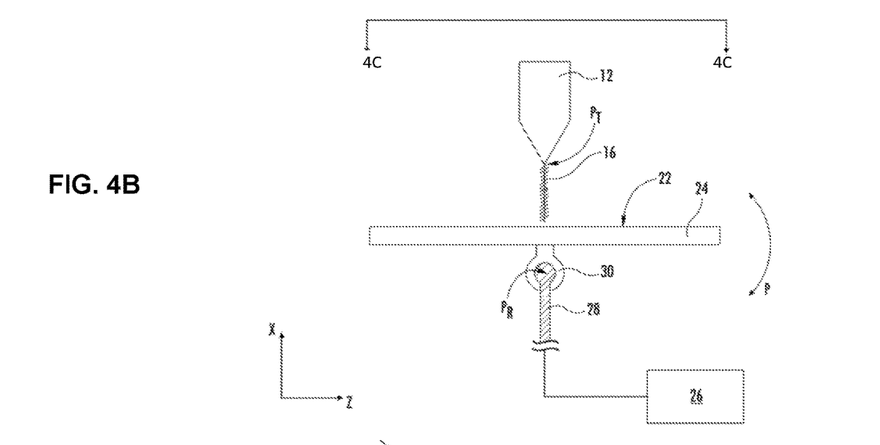
FIG. 4B shows a side view of the exemplary method of FIG. 4A.
Figure 4C:
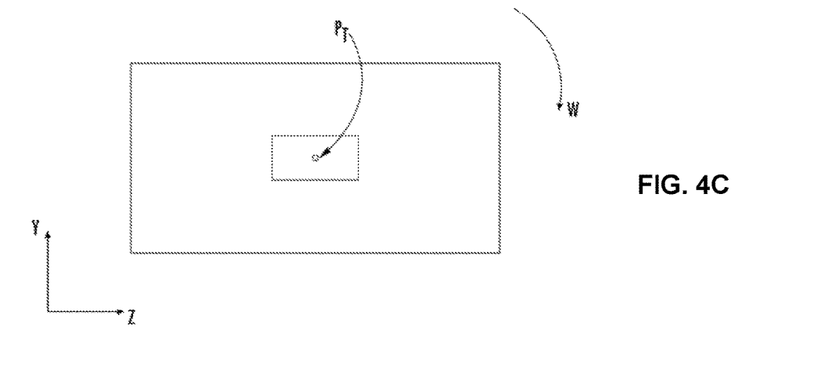
FIG. 4C shows a top view of the exemplary method of FIG. 4A.

FIGS. 4A-4C show an exemplary system including a nozzle 12 having an extrusion tip 14 defining a translational point $P_T$. The nozzle 12 combines a formation material and a fibrous susceptor to form a composite material 16 as described above and illustrated in FIG. 3. During printing, the composite material 16 is deposited onto the printing surface 22 of the print bed 24.

The print bed 24 and/or the printer can be moveable. For instance, in the embodiment of FIG. 4, the print bed 24 is moveable, independently with 6 degrees of freedom, as controlled by a controller 26 in the x-direction (i.e., up/down with respect to the translational point $P_T$), in the y-direction (i.e., laterally with respect to the translational point $P_T$), and z-direction (i.e., cross-laterally with respect to the translational point $P_T$). The print bed 24 can be moved translationally and independently, by controller 26 using the arm 28 connected to the receiver 30 of the print bed 24. In particular embodiments, the arm 28 can be formed from multiple segments connected together at moveable joints (bending and/or rotating) to allow for translational movement of the print bed 24 with respect to the translation point $P_T$.

Additionally, the print bed 24 can be rotationally movable about the rotational point $P_R$ to allow roll (r), pitch (p), and yaw (w) rotational movement. The print bed 24 can be rotated in any direction, independently, by controller 26 using the arm 28 connected to the receiver 30 of the print bed 24. Although shown as utilizing a rotation ball 29 coupled to the receiver 30, any suitable connection can be utilized.

In one embodiment, the controller 26 may comprise a computer or other suitable processing unit. Thus, in some embodiments, the controller 26 may include suitable computer-readable instructions that, when implemented, configure the controller 26 to perform various different functions, such as receiving, transmitting and/or executing arm movement control signals.

The print head can also be moveable. For instance, the print head can be movable in one or both directions of a plane that is generally horizontal to the print bed as is generally known in the art. In one embodiment, the print head can also be moveable in additional directions, for instance in three dimensions, optionally in conjunction with multiple degrees of freedom. In one embodiment, the print head can be on a rail system that can allow for long lengths of uninterrupted deposition, for instance covering a length of 0.5 meters or greater, or 1 meter or greater in some embodiments. This can provide a route for forming a susceptor over a relatively long length, for example in forming a susceptor on the flanges of wind turbine blade skins prior to assembly.

A computer as may control print bed and/or print head movement generally includes a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that when executed by the processor (s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. Memory can also include data that may be retrieved, manipulated, or stored by processor(s).

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the arm 28, the rotation ball 29, and/or the nozzle 12.

Figure 5:
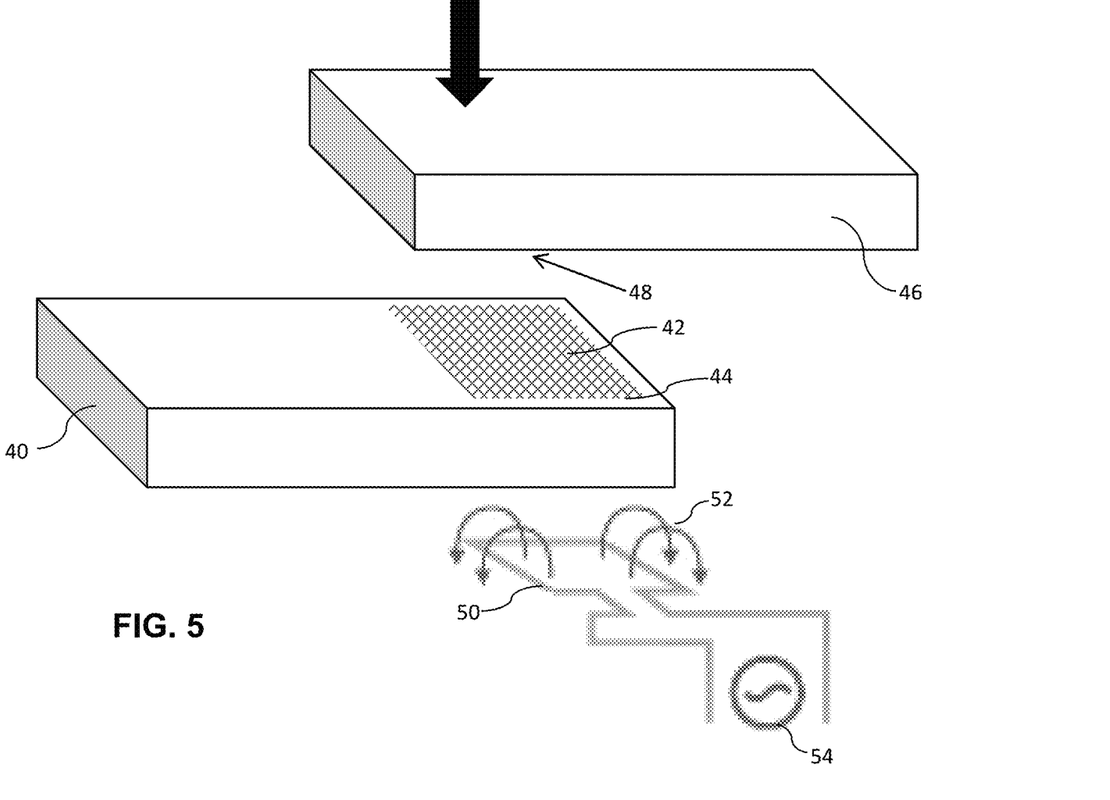
FIG. 5 schematically illustrates an induction welding method using the printed susceptor as described herein.

Following formation of a susceptor pattern on a surface, the surface can be joined to a second surface according to an induction welding process. For instance, as illustrated in FIG. 5, a first polymeric composite 40 can include a susceptor pattern 42 printed at a bonding surface 44. While illustrated as a cross-hatch, regular susceptor pattern 42, it should be understood that the susceptor pattern can be any regular or irregular pattern and can be located over all or any portion of a bonding surface 44. In addition, the entire susceptor pattern 42 can be formed of a single, unbroken composite fibrous susceptor or can be formed of a plurality of fibrous susceptors that can overlap one another and/or can be separated along the entire lengths of the susceptors, with no overlap (e.g., parallel lines of susceptors along a bonding surface). Beneficially, through printing of the susceptor pattern 42 according to a 3D printing methodology as described, the pattern can be individually designed for the materials and application so as to maximize the efficiency of the materials and provide an induction weld ideally designed for the desired application.

In accord with one embodiment of an induction welding process, a first piece 40 can be assembled with a second piece 46 that can include a polymer at the bonding surface 48 to be joined with the bonding surface 44 of the first piece 40. For instance, the first and second pieces 40, 46 can both be fiber reinforced polymeric composites formed of the same or different materials. This is not a requirement, however, and the second piece can be of any suitable construction and materials. For instance, the second piece can be a non-reinforced polymeric component and the first piece can be a fiber reinforced polymeric composite.

In addition, the fibrous composite susceptor can be printed on one or both pieces 40, 46. For instance, the second piece 46 can include a fibrous composite susceptor printed in a pattern on the bonding surface 48 of the second piece 46.

The two pieces can be assembled with the fibrous composite susceptor pattern 42 between the two bonding surfaces 44, 48. The pieces 40, 46 are then held in position, optionally under additional pressure as indicated by the directional arrow in FIG. 5 while an induction coil 50 is activated. The coil 50 and the mated bonding surfaces 44, 48 can be moved relative to one another according to standard practice to control and direct the magnetic field lines 52. For instance, the coil 50 can be pulled along the bond area over the outer surfaces of one or both of the pieces 40, 46 and in general alignment with the susceptor pattern 42. The coil 50 produces an alternating magnetic field in response to an alternating current produced at the generator 54. The magnetic field can project through the pieces 40, 46 and the susceptor pattern 42 to produce eddy currents of sufficient amperage to heat the susceptor. This in turn heats the thermoplastic material of the composite fibrous susceptor to the melting temperature. In the case of a thermoplastic polymer also being present at one or both of the bonding areas 44, 46, this thermoplastic polymer can also be heated to a temperature that is at or above the melting temperature. The thermoplastic polymers can then mix and fuse, creating a fusion bond between the bonding areas 44, 46 and the susceptor. In the case of one or both of the bonding areas 44, 46, incorporating a thermoset polymer at the surface, the thermoplastic polymer of the composite susceptor can function as an adhesive with the thermoset.

The coil assembly 50 can include a central ferromagnetic core around which the coil is wound as well as coolant lines, power lines, etc. as are known in the art. These and other standard components are not included in FIG. 5 for clarity as such are of general knowledge to those of skill in the art.

Figure 6:
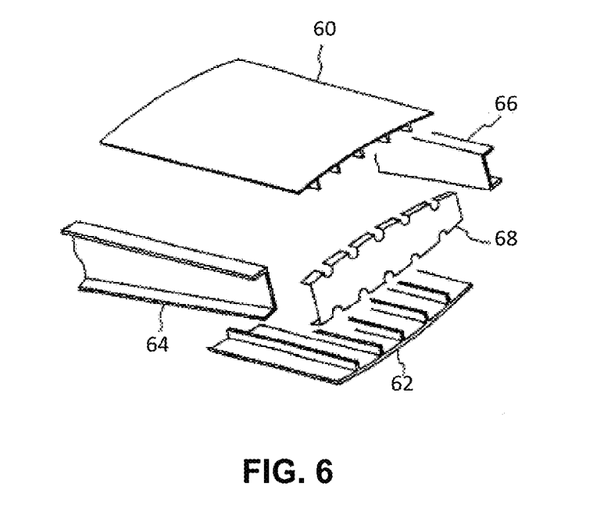
FIG. 6 illustrates a typical aeronautical component in exploded view as may be formed by use of disclosed materials and methods.

The composite fibrous susceptors are particularly suitable for formation of structures for use in high performance environments, e.g., environments operating under high mechanical stresses such as in the aircraft, automotive, marine, energy production, or construction industries, By way of example, FIG. 6 illustrates components of a wing structure as can be welded to one another by use of disclosed materials including an upper skin 60, a lower skin 62, a front spar 64, a rear spar 66, and a plurality of ribs 68 (only one of which is included in FIG. 6). For instance, lap joints as are commonly used to join ribs 68 to spars 64, 66 are good candidates for disclosed induction welding materials and methods because these vertical welds often are buried within the structure where it is difficult to induce homogeneous induction heating using typical susceptors. The spar/skin and rib/skin interfaces are also excellent locations for disclosed induction welding materials and can be utilized to replace mechanical fasteners.

Figure 7:
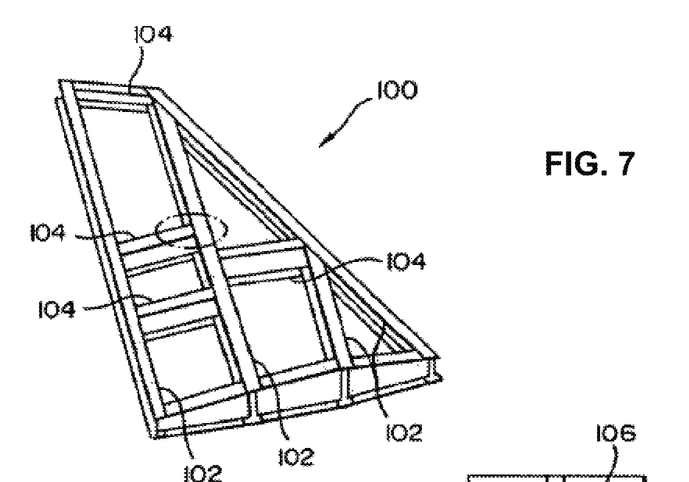
FIG. 7 is a perspective view of a typical wingbox including induction welded web lap joints.
Figure 8A:
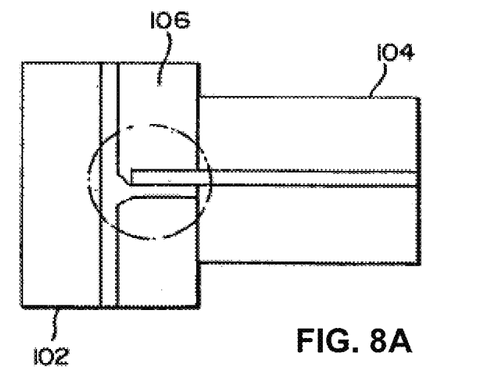
FIG. 8A is a schematic plan view of a typical rib-spar web lap joint.
Figure 8B:
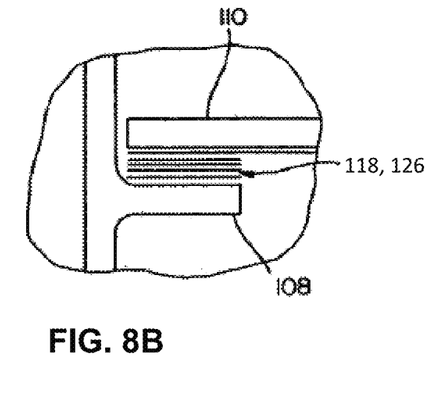
FIG. 8B is a schematic, magnified, detail view of the lap joint of FIG. 8A.

FIG. 7 illustrates a typical composite wingbox 100 as may be formed by use of disclosed induction welding materials and methods. As illustrated, the wingbox 100 includes a plurality of longitudinal spars 102 with transverse ribs 104 interspersed along the run of the spars 102. The ribs 104 and spars 102 are joined at rib-spar web lap joints 106 (circled in FIG. 7), which are schematically illustrated in FIG. 8A and FIG. 8B. Each lap joint involves a tab 108 fabricated into the web of the spar 102 and a tongue 110 at the end of the web of the rib 104. The cap of the rib 104 is cut back at each joint 106 so that the rib web can slide between the spar caps.

As illustrated in FIG. 8B, the overlap between a tab 108 and a tongue 110 defines the bond area where a composite fibrous susceptor 118 has been printed, optionally in conjunction with additional thermoplastic formation material 126 either as a composite material as described above or as separate components, as illustrated in FIG. 8B. The composite fibrous susceptor 118 can then be inductively heated to melt the surrounding thermoplastic polymer and form a weld or adhesive bond between the tab 108 and tongue 110 by directing a magnetic field across the bond area. Following formation, the welded wingbox 100 can be completed by welding an upper skin and lower skin to the spar caps and rib caps.

Of course, the disclosed susceptors are not limited to formation of wingboxes or aeronautical devices in general, and may be beneficially utilized in induction welding of any parts or machines, such as in formation of blades for use in wind turbines as previously mentioned or in any other polymer components.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in-whole or in part. Furthermore, those of ordinary skill in the art will appreciate that the foregoing description is by way of example only, and is not intended to limit the invention so further described in the appended claims.

What is claimed:

1. A method for induction welding comprising:
    depositing a composite fibrous susceptor on a first surface, the composite fibrous susceptor comprising a magnetically susceptible continuous fiber and a thermoplastic polymer, the first surface comprising a second polymer;
    locating a second surface adjacent the first surface with the composite fibrous susceptor extended between the first and second surfaces, the second surface comprising a third polymer; and
    inductively heating the composite fibrous susceptor and thereby forming a bond between the first surface and the second surface.

2. The method of claim 1, wherein the second polymer and/or the third polymer is a thermoplastic polymer.

3. The method of claim 2, wherein the second polymer and/or the third polymer is the same as the thermoplastic polymer of the composite fibrous susceptor.

4. The method of claim 1, further comprising depositing a formation material on the first surface, the formation material comprising a fourth thermoplastic polymer.

5. The method of claim 4, wherein the first thermoplastic polymer and the fourth thermoplastic polymer are the same.

6. The method of claim 4, wherein the formation material and the composite fibrous susceptor are deposited together.

7. The method of claim 1, wherein the second polymer and/or the third polymer is a thermoset polymer.

8. The method of claim 1, wherein the first surface and/or the second surface is a surface of a fiber reinforced polymeric component.

9. The method of claim 1, further comprising depositing a second composite fibrous susceptor on the second surface.

10. The method of claim 1, wherein the composite fibrous susceptor is deposited by use of a 3-D printer.

* * * * *